(12) United States Patent
Gross

(10) Patent No.: US 11,465,750 B2
(45) Date of Patent: Oct. 11, 2022

(54) PASSENGER SEAT SYSTEM HAVING MOVABLE SEATS FOR A TRANSPORTATION MEANS AS WELL AS AN AIRCRAFT CABIN HAVING SUCH A PASSENGER SEAT SYSTEM

(71) Applicant: AIRBUS OPERATIONS GMBH, Hamburg (DE)

(72) Inventor: Claus-Peter Gross, Hamburg (DE)

(73) Assignee: Airbus Operations GmbH

( * ) Notice: Subject to any disclaimer, the term of this patent is extended or adjusted under 35 U.S.C. 154(b) by 582 days.

(21) Appl. No.: 15/916,085

(22) Filed: Mar. 8, 2018

(65) Prior Publication Data

US 2018/0194476 A1    Jul. 12, 2018

Related U.S. Application Data

(63) Continuation of application No. PCT/EP2016/073139, filed on Sep. 28, 2016.

(30) Foreign Application Priority Data

Sep. 28, 2015 (DE) .......................... 102015116414.0

(51) Int. Cl.
*B64D 11/06* (2006.01)
*B60N 2/015* (2006.01)

(52) U.S. Cl.
CPC ........ *B64D 11/064* (2014.12); *B60N 2/01516* (2013.01); *B60N 2/01558* (2013.01); *B64D 11/0696* (2013.01)

(58) Field of Classification Search
CPC . B64D 11/064; B64D 11/0696; B64D 11/003; B60N 2/01558; B60N 2/01516;
(Continued)

(56) References Cited

U.S. PATENT DOCUMENTS 4,376,522 A    3/1983 Banks
4,493,470 A    1/1985 Engel
(Continued)

FOREIGN PATENT DOCUMENTS

DE              3342503 A1    6/1985
DE        102009004987 A1    7/2010
(Continued)

*Primary Examiner* — Medhat Badawi
*Assistant Examiner* — Vicente Rodriguez
(74) *Attorney, Agent, or Firm* — Lerner, David, Littenberg, Krumholz & Mentlik, LLP

(57) ABSTRACT

A passenger seat system for a transportation system includes at least one support structure and at least one seat, which includes a seat frame, which is movable and arrestable on the support structure and has an underside that rests on the support structure and an upper side that receives a seating surface. The seat frame has an arresting device on the underside and an operating unit on the upper side coupled with the arresting device. This is movable into an arresting position and a release position and is blockable at least in the arresting position through a lockable blocking device. The arresting device is adapted for arresting the seat frame on the support structure with the operating unit being in the arresting position and to release it with the operating unit being in the release position.

15 Claims, 9 Drawing Sheets

(58) Field of Classification Search
CPC .... B60N 2/0155; B60N 2/01508; B60N 2/08; B64C 1/18
See application file for complete search history.

(56) References Cited

U.S. PATENT DOCUMENTS

| | | | |
|---|---|---|---|
| 4,597,552 A | | 7/1986 | Nishino |
| 4,925,229 A | * | 5/1990 | Siebler ............... B60N 2/01541 296/65.09 |
| 4,936,527 A | | 6/1990 | Gorges |
| 5,509,722 A | * | 4/1996 | Beroth ............... B64D 11/0693 244/118.6 |
| 6,189,852 B1 | * | 2/2001 | Hopley .............. B60N 2/01591 248/429 |
| 6,260,813 B1 | * | 7/2001 | Whitcomb ......... B64D 11/0696 244/118.6 |
| 7,641,370 B2 | * | 1/2010 | Heine .................... B64D 11/00 362/471 |
| 2003/0189370 A1 | * | 10/2003 | Hemmer ............ B60N 2/01566 297/344.11 |
| 2006/0032979 A1 | | 2/2006 | Mitchell et al. |
| 2009/0026827 A1 | * | 1/2009 | Bishop ................. B60P 7/0815 297/463.1 |
| 2010/0051746 A1 | | 3/2010 | Law |
| 2011/0073742 A1 | * | 3/2011 | Marechal ........... B64D 11/0696 248/503.1 |

FOREIGN PATENT DOCUMENTS

| | | |
|---|---|---|
| DE | 102013103662 A1 | 10/2014 |
| EP | 0215495 A2 | 3/1987 |
| EP | 1607329 A1 | 12/2005 |
| WO | 2008113610 A2 | 9/2008 |

* cited by examiner

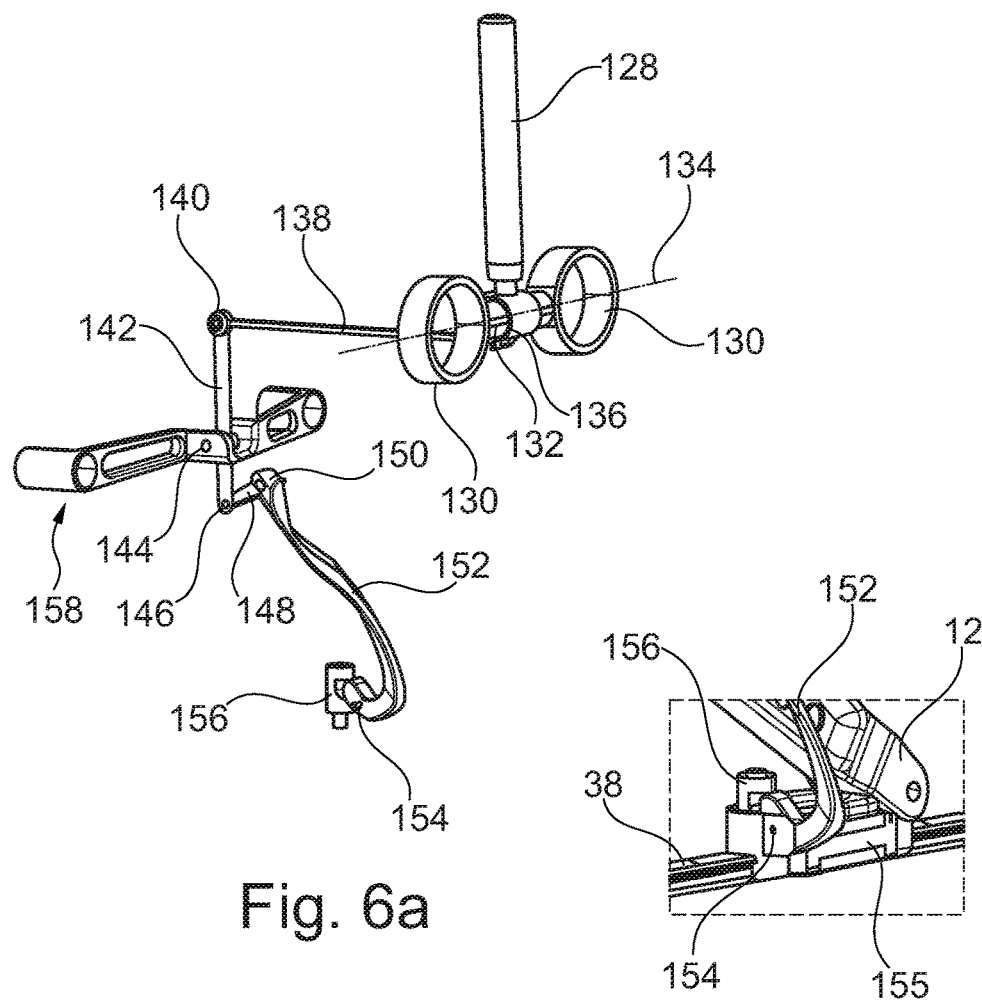
Fig. 6a
Fig. 6c
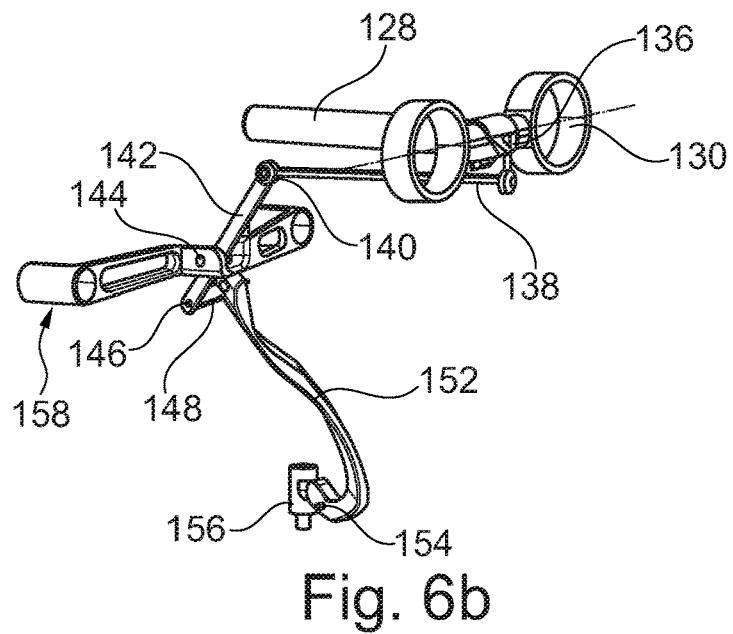
Fig. 6b

PASSENGER SEAT SYSTEM HAVING MOVABLE SEATS FOR A TRANSPORTATION MEANS AS WELL AS AN AIRCRAFT CABIN HAVING SUCH A PASSENGER SEAT SYSTEM

CROSS-REFERENCE TO RELATED AND/OR PRIORITY APPLICATIONS

This application is a continuation of international patent application number PCT/EP2016/073139, having an international filing date of Sep. 28, 2016, which claims priority to German patent application number DE 102015116414.0, having a filing date of Sep. 28, 2015. The content of the referenced applications is incorporated by reference herein.

TECHNICAL FIELD

Embodiments of the invention relate to a passenger seat system for a transportation system as well as an aircraft cabin having such a passenger seat system.

BACKGROUND

The passenger cabin of a transportation means and particularly of an aircraft comprises a layout determined by the operator of the transportation means, which layout is commonly divided into different classes. These classes particularly distinguish from each other in that passenger seats, which are arranged one behind the other, comprise a certain minimum distance in a longitudinal direction depending on the class.

Passenger seats, partitions and other installations are usually mounted on rails, which are arranged in the floor of the cabin and extend in longitudinal direction of the cabin. For a reconfiguration of a passenger cabin it is thus required to loosen the passenger seats from the rails and to fix them again on another place with the predetermined distances. Through changing the distance between two passenger seats, consequently the seating class of the respective section in the passenger cabin may be changed.

For arresting of a passenger seat on a seat rail, a plurality of different arresting means is known. These often base on the clamping to shape features of the seat rail by means of movable mushroom-shaped elements. For moving passenger seats along seat rails, automatable devices with an electrical drive are known.

For example, patent publication DE 10 2009 004 987 B4 shows a slidable seat for a transportation means having a seat frame for displaceable attachment to a support structure of the transportation means, wherein the seat is configured such that two such successively arranged seats in the transportation means in a collapsed state have a smaller common base surface than in a pushed-apart state of use.

Patent publication DE 10 2013 103 662 A1 shows a holding apparatus for fixing passenger seats in a transportation means, which comprises a seat leg fixation element, a gliding element and a rail element.

The use of drive devices may lead to a higher weight of a cabin installation, which increases the costs for manufacturing and operation particularly of an aircraft. Further, releasable resting means are often releasable and fixable only by maintenance personnel, such that a quick change of configuration particularly between landing and take-off of an aircraft, which follow each other in a short-term, is practically not feasible.

BRIEF SUMMARY

Thus, it is an object of the disclosure to propose a passenger seat system, which leads to a particularly low additional weight and which is operatable without maintenance personnel.

This object is met by the features of claim 1. Advantageous improvements and embodiments can be gathered from the sub-claims and the following description.

A passenger seat system for a transportation system is proposed, the passenger seat system comprising at least one support structure and at least one seat having a seat frame, which is movable and arrestable on the support structure and has an underside that rests on the support structure and an upper side that receives a seating surface. The seat frame comprises an arresting device on the underside and an operating unit on the upper side coupled with the arresting device. The operating unit is movable into an arresting position and a release position and is blockable at least in the arresting position through a lockable blocking device. The arresting device is adapted for arresting the seat frame on the support structure with the operating unit being in the arresting position and to release it with the operating unit being in the release position.

The support structure serves as a base for mounting a passenger seat in a passenger cabin and is usually realized in form of parallelly arranged support rails, the so-called seat rails, which are provided with a grid. The grid allows a positioning of the respective passenger seat in a longitudinal direction of a cabin as well as a sufficient arresting. Particularly, in an aircraft, the support structure to be designed mechanically, such that 16 G loading tests, which are relevant for a certification, are accomplished. The support structure thus is usually fixedly connected to the structure of the transportation system and thereby allows a sufficient load introduction into the structure.

For a facilitated movability of a seat on the support structure, the support structure may be equipped with guiding devices in a suitable manner, wherein these may either be directly integrated into the support structure or, in the case of retrofitting already existing support structures, such as seat rails, may be retrofitted thereon for realizing an embodiment of the invention. The guiding function may be realized through using an already existing, particularly centrally arranged slit in a seat rail, but may also be realized through an additional, separate gliding guide having two profile cross-sections that are matched to each other and engage into each other and are movable along each other.

The seat frame of the at least one seat may be designed in a manner common for transportation systems and may particularly be equipped with frame legs resting on the support structure and support elements that extend transverse thereto. Particularly with application of the passenger seat system according to the disclosure in aircraft, four legs of a metallic material having a profile cross-section with projections may be used, which legs are provided with openings or recesses in surface areas with a low loading, e.g. webs that are surrounded by projections, for weight reasons. Substantially horizontally extending support elements, such as support tubes or other elements, may follow on, which carry the seating surfaces. In the design of the seat frame, also a plurality of seats may be arranged on a single seat frame, such that the support elements may clearly extend over the seat frame in a lateral direction.

In the following consideration, an upper side of the seat frame, which receives the seating surface, is referred to as "top side", while an underside that comes into contact with the support structure is referred to as "bottom side". The height of the seat frame and thus the approximate vertical position of the top side of the seat frame are determined through a respective seating height for a passenger seat.

The arresting device is to be understood as an apparatus, which allows a selective arresting of the seat frame on the support structure, which arresting device should be releasable preferably quickly and without much effort, but should be arrestable again reliably and the seat frame should be exposable to the full load, on which the dimensioning of the seat frame is based.

The operating unit as an apparatus facing the user, may exemplarily be mechanically coupled with the arresting device through a linear movement element or another device in a manner that a user may reliably release and activate the arresting device, wherein the use of tools shall not be necessary. The arrangement of the operating unit at the top side of the seat frame additionally allows a somewhat further facilitated operating position for the user, since a handling of elements of the arresting device at the top side of the seat frame is a somewhat more ergonomic than practically directly at the floor, i.e. at the bottom side of the seat frame.

The coupling, exemplarily through a linear movement element, may comprise different designs. On the one hand, kinematical, stiff chains over a multi-link construction are possible, through which both pressure forces as well as pulling forces are transferable. On the other hand, Bowden cables suggest themselves, which may as well transfer pulling forces and pressure forces, wherein pressure forces may only be transferred over relatively short link paths. As further alternatives, wire or chain links suggest themselves, which only transfer pulling forces.

The blocking device prevents an inadvertent operation of the operating unit and may be realized through different single- or multi-step devices. These may be realized manually lockable or self-lockable. In case it is realized self-lockable and not operated it locks itself, i.e. it urges into a state that blocks the operating unit. This may particularly be realized through a spring mechanism, which lets a safety pin or similar element engage into a movable element of the operating unit and holds it relative to a fixed, immovable part of the seat frame.

The aim of this arrangement is to allow a facilitated movability of passenger seats without the use of tools through cabin personnel, particularly during the so-called turnaround time, wherein an inadvertent operation of the arresting device shall be prevented through the position of the operating unit at a top side of the seat frame and furthermore, an operation at a bottom side of a seat frame, which is uncomfortable for cabin personnel, is also prevented. At the same time, a high arresting safety through the arresting device is ensured.

The operating unit and the blocking device are preferably arranged relative to each other, such that they cannot be handled with a single hand at the same time. An inadvertent releasing or operating of the operating unit may consequently be almost impossible. Particularly preferred, the operating unit and the blocking device are not handleable with one hand at the same time, but require differently and concurrently conducted motions in different directions, which prevents an inadvertent releasing very well.

As explained previously, in an advantageous embodiment, the support structure comprises an elongated seat rail having first locking device, element, or means distributed along a longitudinal grid, wherein the arresting device is adapted for being arrested at the first locking element, i.e. directly on the support structure. The first locking element may be openings, which are arranged at positions that conform the grid of the seat rail. The arresting device may comprise locking bodies, which are shaped corresponding thereto and which are introduced through the openings into the seat rail and thus cause a form-fit arresting. As a matter of course, other variants of seat rails, locking element and arresting devices are possible, which may selectively conduct an arresting of a longitudinally movable seat.

For supporting the guiding motion, the support structure may comprise at least one guiding body arranged on the seat rail, which guiding body extends parallel to the seat rail and is coupled therewith, wherein the guiding body is adapted for guiding a guiding section of the seat frame along the seat rail. The guiding body may thus constitute a guiding rail or gliding rail, on which the seat frame is guidable. For this purpose, the guiding section at the bottom side of the seat frame exemplarily comprises a respective slider or another device, which is engageable with the guiding body and is movable thereon. The design of the respective profile cross-section is completely free in principle, as long as a desired linear guiding may be accomplished, wherein profiles having undercuts also allow an additional introduction of force from the seat frame into the seat rail.

Basically it is conceivable that the arresting device interacts with the guiding body mechanically, in order to conduct an arresting of the seat frame on the seat rail. This is advantageous especially when the guiding body completely covers the seat rail. In such a case, the at least one guiding body may comprise a second locking device, element, or means, which particularly preferred, but not necessarily correspond with first locking element of the seat rail. In a particularly simple case, the guiding body may comprise openings, which extend into the seat rail from a surface opposite to the seat rail through the guiding body. For the desired operation purpose, it may also be convenient if not all first locking elements comprise a pendant in form of a second locking element, but to repeat only a part of the first locking element in the guiding body. In particular, in limited regions within the cabin, which is equipped with the passenger seat system, as well as only a few intended or desired locking positions, even only a small part of the first locking element may be repeated in form of second locking element. It is, however, desirable for allowing the movement of passenger seats within a relatively wide area of the passenger cabin to equip the seat rails with guiding bodies completely.

In a particularly advantageous embodiment, the arresting device comprises an arresting body, which is movably supported perpendicular to grid openings of the support structure in a spring-loaded manner, wherein the spring-loaded support is designed in a way that the arresting body is urged to the support structure or into a grid opening, respectively. It shall be understood, that the spring-loaded arresting body is shaped to conform the locking openings and to enter the locking openings easily. Through the spring-loaded support it would be sufficient to only exert a pulling force onto the arresting body, such that it may move out of a locking opening and to re-enter a locking opening without an acting pulling force on its own. In this context it is conceivable to compensate the pulling force onto the arresting body after removing the arresting body from a locking opening and to shift the seat frame slightly, such that the longitudinal position of the arresting body does not match with the respective locking opening any more. The arresting body consequently rests on the guiding body through the spring force acting on it. With continued displacement motion of the seat frame, the arresting body will snap into a locking opening, as soon as its longitudinal position matches the longitudinal position of the respective locking opening. The arresting is thereby particularly simply handleable but nevertheless leads to a very reliable arresting. Additionally, through the spring-loaded support, the locking of the seat frame is acoustically clearly noticeable.

The operating unit may comprise a pulling lever. A pulling lever may exemplarily be accessible from a front or back side of a seat and may be gripped with one or multiple fingers of a hand and may be pulled into a direction, which may lie in a horizontal plane. The arresting device will be moved through the motion element or another device for coupling and releases its arresting of the support structure. Particularly preferred the pulling lever is blockable through a blocking device at least in a neutral position, wherein the blocking device comprises an engagement element, which is movable in a direction at an angle to the pulling direction of the pulling lever and particularly in a perpendicular direction.

The operating unit in an advantageous embodiment comprises a handle movably supported along a first displacement direction, which handle is securable in at least one position through a pin, i.e. is blockable or lockable, which pin is movably supported along a second displacement direction, which is at an angle to the first displacement direction. The pin thereby engages a recess, depression or hole of the handle or a body arranged thereon, which extends along the second displacement direction. The displacement of the handle may be prevented through arresting the pin in a structurally fixed part of the blocking device or the operating unit. The first displacement direction and the second displacement direction may particularly preferred extend perpendicular to each other.

In a particularly advantageous embodiment, the handle is rotatable and may be arrested in at least one position through rotation. To accomplish this, the handle is not only movable, but also rotatably supported at least about a certain angular range. Through form- and/or force-fitting means, which are activatable or releasable through rotation, the handle is held in its momentary position along the first displacement direction or released therefrom.

The operating unit may further comprise an operating lever, which is movable between a neutral position and an arresting position, wherein the blocking device comprises a first release button, which releases the blocking device through operating and releases the operating lever. An inadvertent operation of the operating lever with one hand is thereby prevented. Preferably, the release button is distanced from the operating lever in a way that a simultaneous operation of the release button and the operating lever is impossible. Further preferred, the release button is supported in a spring-loaded manner and the spring-loaded support is adapted such that the release button is always urged into a locking position. Particularly, the operating lever is substantially swivably supported in a horizontal plane and is at one end connected with the linear motion element or another device for coupling with the arresting device or is coupled with the motion element or another device through one or a multitude of elements between the operating lever and the linear motion element, such that the motion element or another device for coupling is moved, as soon as the operating lever is swiveled.

In a further advantageous embodiment, the blocking device comprises a second release button, which releases the blocking device through a synchronous operation with the first release button. The second release button may be supported in a spring-loaded manner in the same way as the first release button, such that it is always urged into a locking position.

In a further advantageous embodiment, an armrest of the seat constitutes a part of the blocking device, wherein the armrest releases the operating unit in an upwardly swept position. In a modification thereof, the moving of a further unlocking element is required after the armrest is upwardly swept in order to fully unlock the operating unit. Through the operation of the armrest, a particularly large spatial separation between deploying an operating unit and the blocking device is ensured. The operating unit may comprise a handle or similar element for moving the linear movement element or another device suitable for coupling with the locking element, which handle is also movably supported on the seat frame and coupled with the device for coupling.

In another advantageous embodiment the operating unit is coupled with the arresting device through a multi-link chain comprising a plurality of interconnected links, the multi-link chain comprising a first end and a second end, wherein the first end is swivably coupled with the arresting device and wherein the second end is coupled with the operating unit. For example, if the arresting device comprises an arresting body, such as a locking pin, the second end of the multi-link chain may be adapted to move the arresting body in a direction perpendicular to the upper surface of the support structure. The multi-link chain provides a direct connection between the operating unit and the arresting element and a spring for urging an arresting body from one position to another is not required. Pulling and pushing forces are directly transferable. Further, the arresting body is always in a correct position and no further visible checking of the arresting body position is necessary.

Preferably, the seat frame comprises at least one tube at its upper side for receiving a seating surface, wherein the operating unit is clamped to the at least one tube. Hence, the installation of an operating unit may simply be conducted as a retrofit solution. In case the seat frame comprises a common arrangement of two parallel arranged tubes the operating unit may be clamped to both tubes and may extend between the tubes. This provides a certain level of protection of the operating unit from inadvertent operation, as the operating unit is hidden between the tubes.

Further, the seat may comprise a seating surface, which is swivably mounted on the seat frame, wherein the operating unit comprises an operating lever, which is swivably in an upward direction. Such a swiveling may only be conducted once the seating surface is swiveled upwards. This further reduces the probability of an inadvertent operation.

A seat of the passenger seat system may be foldable or removable, such that when moving the individual passenger seats, these may at least partially be compacted or such that a total number of passenger seats is reducible. This is exemplarily derivable from patent documents DE 10 2009 004 987 B4 or DE 10 2013 103 662 A1.

The disclosure further relates to an aircraft cabin having the above-mentioned passenger seat system.

Furthermore, the aircraft cabin may be equipped with a plurality of service units, which are arranged above passenger seats. A service unit is to be understood as a device, which comprises different displays, e.g. for a request for fastening seat belts or a non-smoking signal, a speaker for announcements, an air nozzle, a container for oxygen masks and similar components and correlates with passenger seats arranged thereunder. Particularly advantageous, the number of service units equals at least a maximum number of passenger seats arranged thereunder in the respective region, such that by displacing the passenger seats or during changing the seat distances, respectively, a moving of the service units is not required. It is furthermore conceivable to provide a number of service units, which even exceeds the maximum number of possible passenger seats. Covering each passenger seat independent from the distances between the passenger seats, may thereby be ensured. Depending on the respective region in the cabin, which is to be equipped with the passenger seat system, a certain over-determination may be accomplished with which the number of service units slightly exceeds the maximum number of passenger seats, wherein an excess of 5 to 10% is conceivable, which, however, may also be larger or smaller.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Other characteristics, advantages and potential applications of the present disclosure result from the following description of the exemplary embodiments illustrated in the figures. In this respect, all described and/or graphically illustrated characteristics also form the object of the disclosure individually and in arbitrary combination regardless of their composition in the individual claims or their references to other claims. Furthermore, identical or similar objects are identified by the same reference symbols in the figures.

FIGS. 6a to 6c show a partial view of an operating element and a multi-link chain in spatial views.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1A:
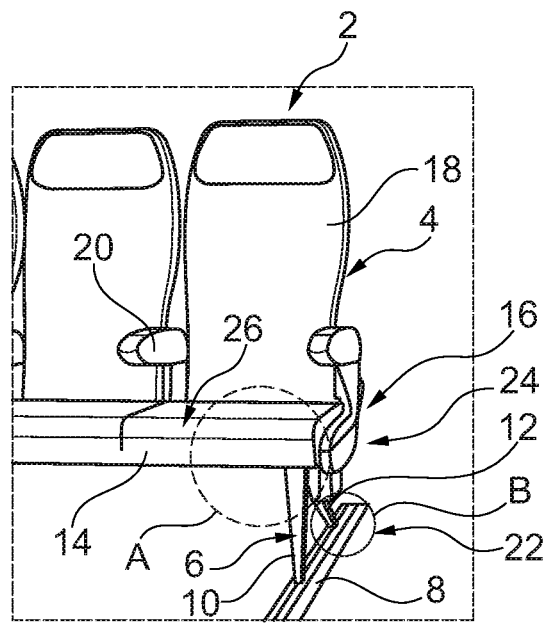
FIGS. 1a and 1b show a passenger seat with an indicated operating unit.

FIG. 1a shows a passenger seat system having a passenger seat group 2 with a plurality of passenger seats 4 on a seat frame 6, which is arranged on a support structure in form of a seat rail 8. The seat frame 6 comprises forward legs 10 as well as rear legs 12, which extend from the seat rail 8 to seating surfaces 14 arranged on the seat frame 6. Backrests 18 extend from the seat frame 6 from a region near a rear edge 16 of the seating surfaces 14 substantially vertically upwards, wherein the backrests 18 are separated through armrests 20 in a horizontal direction. The side of the seat frame 6 in contact with the seat rail 8 will be referred to as bottom side 22 in the following, while the seating surfaces 14 are arranged on a top side 24 of the seat frame 6.

Figure 1B:
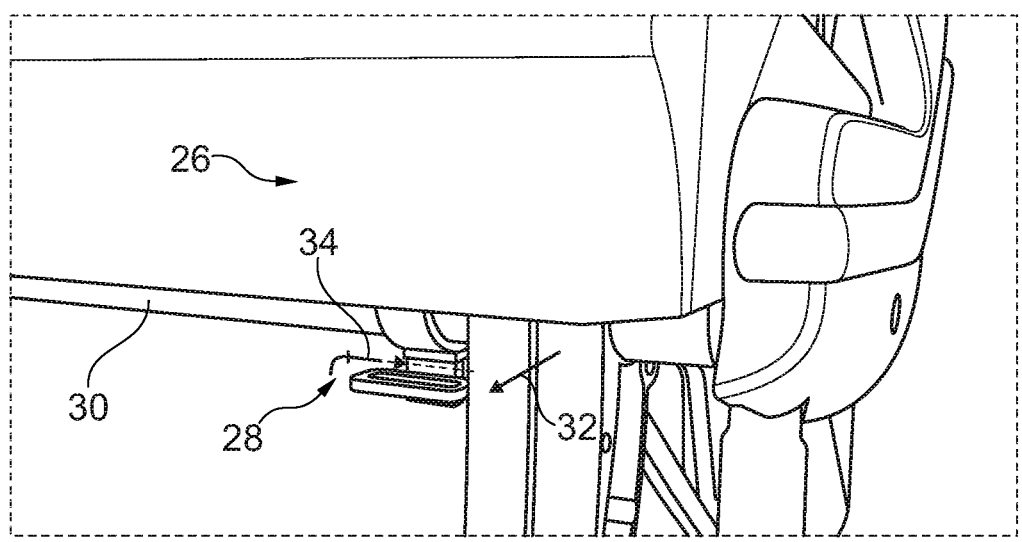

FIG. 1b shows a detail, which is marked with "A" in FIG. 1a. Here, an operating unit in form of a simple pulling lever 28 is shown, which is exemplarily mounted to a support tube 30 of the seat frame 6 and is movable in a horizontal direction 32. At an end of the pulling lever 28, which end is not visible in this depiction, a linear movement element, exemplarily a Bowden cable, is arranged, which is coupled with an arresting device, which is also not illustrated. The pulling lever 28 is protected from an inadvertent operation through its position relatively far behind the forward edge 26 of the seating surface 14.

Furthermore, the illustration in FIG. 1b is to be understood to be schematically, since in the space between the top side 24 of the seat frame 6 and the floor underneath the seat 4, baggage should also be insertable and stowable, wherein these should not operate the pulling lever 28 when inserted from a back side of the seat 4 underneath the seat 4. The pulling lever 28 should therefore be designed such that it disappears in a kind of seat shell of the seat 4 or is covered by it.

Also, securing the pulling lever 28 through a blocking device in form of a pin 34, which is supported in a spring-loaded manner, is conceivable, which pin 34 is insertable transverse to the pulling direction 32 of the pulling lever 28 into the pulling lever 28 and a structurally fixed part and which is urged to the pulling lever through a spring force. Only by pulling the pin 34 out and holding it, the pulling lever 28 may be operated.

Figure 2A:
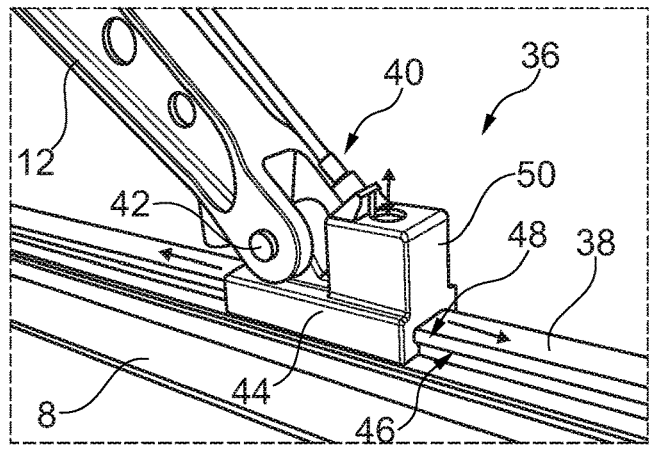
In FIGS. 2a to 2c an arresting unit is shown in a plurality of different spatial views.
Figure 2B:
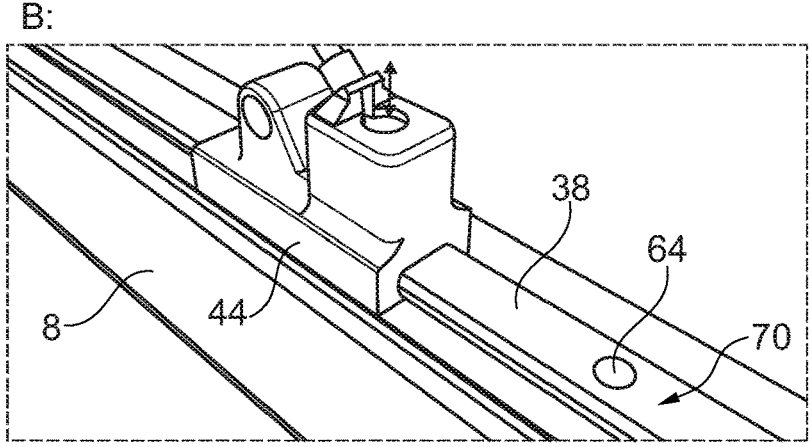
Figure 2C:
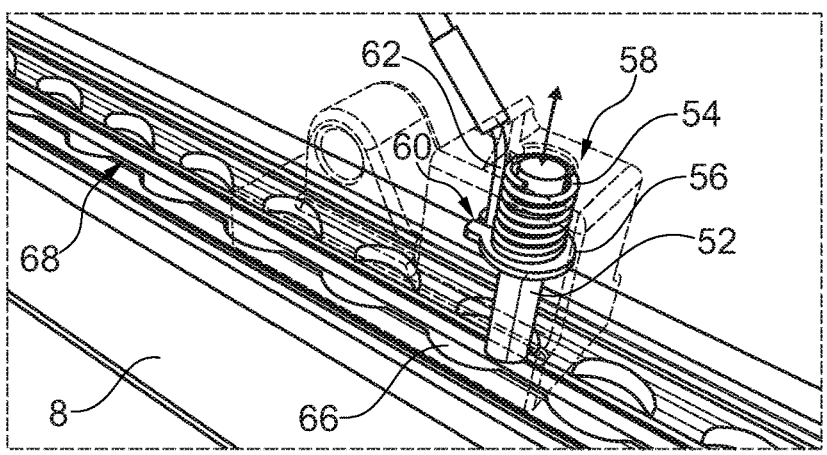

In FIGS. 2a to 2c, exemplarily an arresting device 36 at a rear leg 12 of the passenger seat 4 is shown and the respective position is marked with "B" in FIG. 1a. Here, a seat rail 8 with a guiding body 38 arranged thereon is shown, wherein a lower end 40 of the rear leg 12 is arranged on a slider 44 through a joint 42, which slider 44 is movably supported on the guiding body 38. Merely as an example, the guiding body 38 comprises a profile having at least one undercut 46, which corresponds with a recess 48 in the slider 44. Resultantly, the slider 44 may very easily be moved along the extension direction of the seat rail 8 or the guiding body 38, respectively, and may however receive a force vertically to the extension direction of the seat rail 8. For this purpose, the guiding body 38 is connected with the seat rail 8 sufficiently firmly.

The arresting device 36, which constitutes an integral component with the slider 44 in this illustration, comprises a block 50 on its top side facing away from the guiding body 38, the block 50 having an arresting body 52 movably arranged therein, which is movable perpendicular to the extension direction of the seat rail 8 or the guiding body 38, respectively.

FIG. 2c shows the arresting body 52, which is surrounded by a pressing spring 54, which extends between a trigger ring 56 mounted to the arresting body 52 and a step 58 at an upper side in the interior of the block 50. The trigger ring 56 may be movable through a respective coupling through the end 60 of a Bowden cable as a linear movement element, through which the arresting body 52 follows the motion and through which the pressing spring 54 is compressed. Through relieving the Bowden cable 62, the pressing spring 54 acts on the trigger ring 56 and thereby urges the arresting body 52 in a direction facing to the seat rail 8 or the guiding body 38, respectively.

In FIG. 2c it is particularly well visible that the guiding body comprises second locking means 64 in form of boreholes, which may correspond to a part of first locking means 66, which are previously referred to as grid openings 66, of the seat rail 8. The boreholes may furthermore be oval or elliptical, respectively, or may comprise a completely other shape. The seat rail 8 comprises first locking means 66 in form of openings, which are penetrated by a central slit 68, which extends along the extension direction of the seat rail 8, as particularly common for passenger seats in aircraft cabins.

In case the arresting body 52 is latched into a second locking means 64, through pulling the Bowden cable 62 this arresting may be released. If the slider 44 is moved with the arresting body 52 being lifted, by relieving the Bowden cable 62, the arresting body 52 will be pressed onto the surface 70 of the guiding body 38 through the pressing spring 54. With continued displacement of the slider 44, the arresting body 52 snaps into a second locking means 64, if it is positioned flush to it. An arresting/snapping-in is accomplished, which is noticeable acoustically, such that the user gains knowledge of the arresting device 36 being arrested.

As visible in FIGS. 2a to 2c, the Bowden cable 62 may extend along the rear leg 12 to the (arbitrarily designed) operating unit. Since commonly two parallel seat rails 8 for mounting of passenger seats are used, two arresting devices 36 should be used, which engage with both seat rails 8. Both arresting devices 36 may be linked with a Bowden cable 62 and may be moved by the same operating unit, completely independent from its design.

Figure 3A:
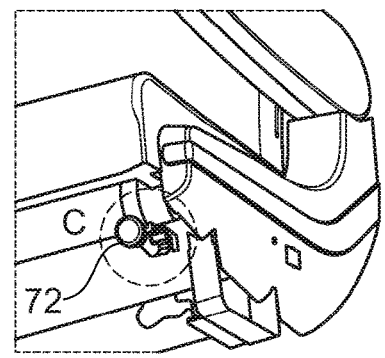
FIGS. 3a to 3f show a further exemplary embodiment of an operating unit in a plurality of spatial views in its operating sequence.

In FIGS. 3a to 3f, a modified operating unit is shown. In FIG. 3a, the position of an operating unit in form of a handle 72 is shown, which is illustrated in FIGS. 3b to 3f from different perspectives and with subsequent operating steps. The handle is particularly movably supported in a horizontal plane.

Figure 3B:
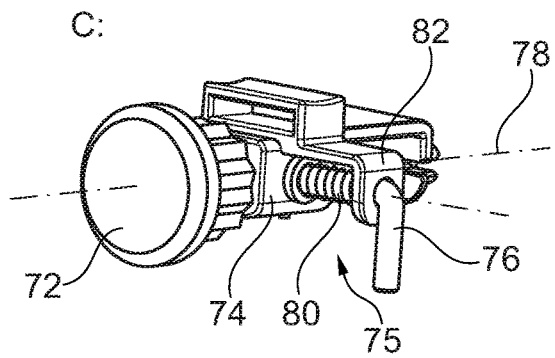

FIG. 3b shows handle 72 in a neutral position, in which the handle 72 is arranged as flush as possible on the handle base 74. The handle 72 in this position is secured by a blocking device 75, which comprises a pin 76, which extends perpendicular to a longitudinal axis 78 of the handle 72 and which is urged to the handle 72 through a pressing spring 80 in a holding bracket 82. For releasing the handle 72, consequently a movement of pin 76 into a direction 84 perpendicular to the extension axis 78 is required.

Figure 3C:
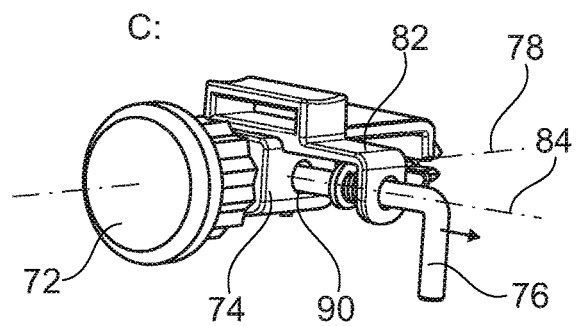
Figure 3D:
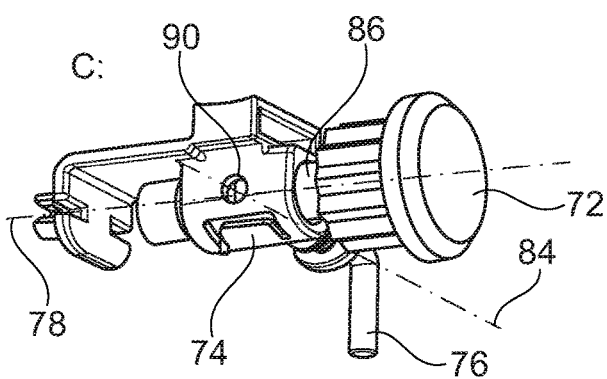
Figure 3E:
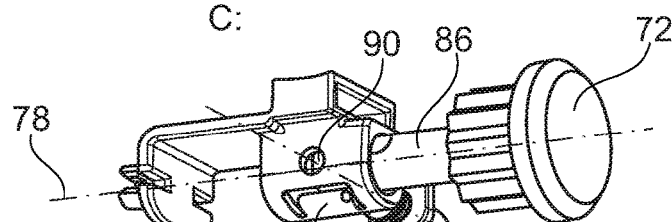
Figure 3F:
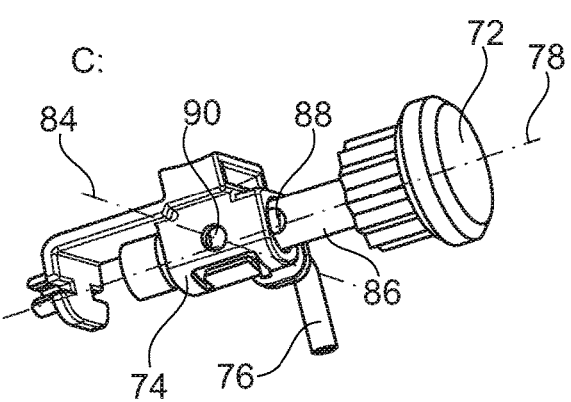

In FIG. 3c, pin 76 is slightly pulled out from handle base 74 in direction 84, such that the handle 82 is unblocked. It is conceivable that handle 72 comprises a shaft 86 for this purpose, which is equipped with a first continuous borehole 88, which is exemplarily shown in FIG. 3f. For holding the handle 72 in its unblocked state at least temporarily, without having to hold pin 76 permanently, the handle 72 may be rotated. The handle 72 is shown in a rotated position in FIG. 3d in which due to the rotation, the continuous borehole 88 is not flush with a corresponding continuous borehole 79 of shaft base 74 anymore. In this position, handle 72 may be moved along the handle base 74 without having to hold pin 76, wherein the pin 76 remains in the displaced position shown in FIG. 3c due to the rotation of exemplary 90°.

Due to displacing the handle 72 being unblocked in this manner, it may be moved along its extension axis 78, such that a Bowden cable arranged thereon operates the arresting device 36. The connection of the Bowden cable 62 is not shown for simplification purposes. It is conceivable that handle 72 may be rotated into an opposite direction after pulling it out, in order to exemplarily let the pin 76 snap into a second continuous borehole (not shown) in the shaft 86, such that seat 4 is not arrested, but is movable along the guiding body 38 in the released state.

A further operating unit 90 is shown in FIGS. 4a to 4e. The figures are shown partially transparent for clarifying its functionality.

An operating lever 92 is swivably supported in a housing 96 around a first, exemplarily vertical axis 94 and is connected to a movably supported pin 102 through a joint in a section 98 within the housing 96. The pin is movably supported in housing 96 along a direction 104 perpendicular to the rotational axis 94.

A blocking device 91 may impede the motion of pin 102 or the operating lever 92, respectively. Blocking device 91 comprises a securing pin 106, which is movably supported within housing 96 parallel to said axis 94 and is connected to a holding bracket 108, which is mechanically engageable with pin 102. The operating lever 92 further comprises a second button 110, which moves a second securing claw 112, which is engageable with a recess 114 of the housing. This operation principle is shown with FIGS. 4a to 4e in a chronologic manner.

Figure 4A:
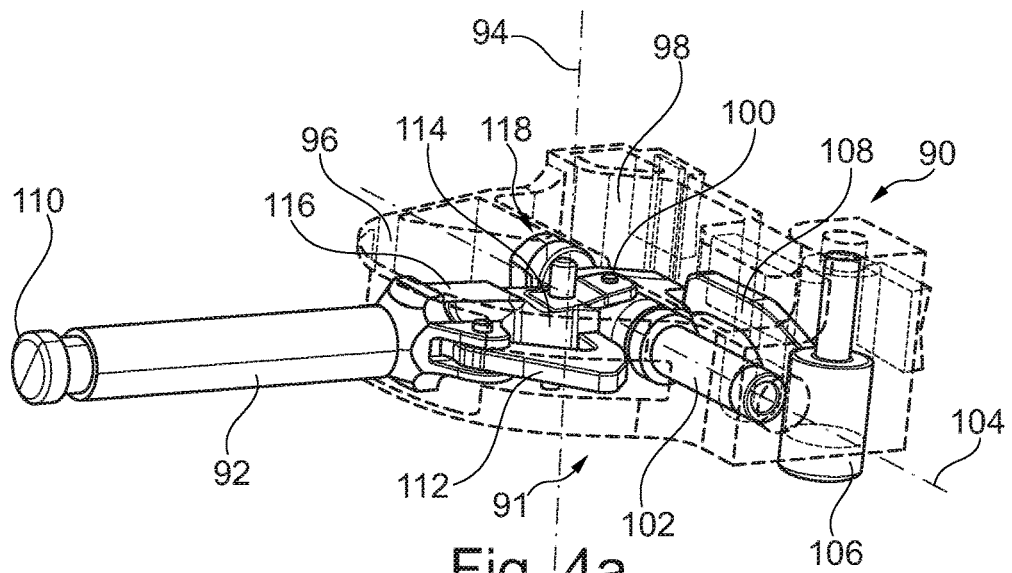
FIGS. 4a to 4f show a further exemplary embodiment of an operating unit in a multitude of spatial views in its operating sequence.

In FIG. 4a, the buttons 106 and 110 are in a neutral position, they are not pressed-in and are held in this position by means of a spring or another retention mechanism. The operating lever 92 is not swivable around axis 94 in this position.

Figure 4B:
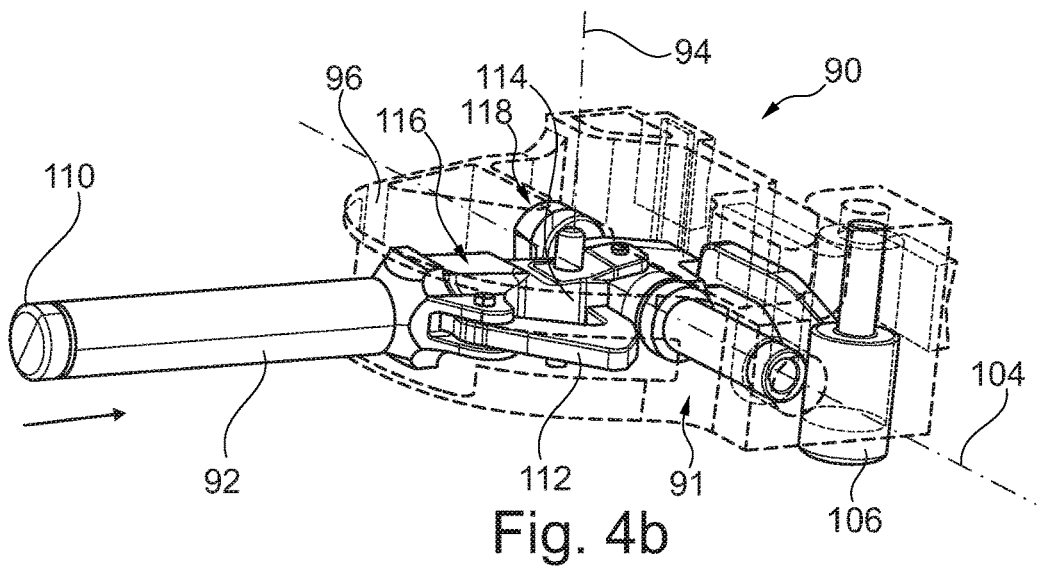

For unlocking a user at first presses one of both buttons 106, 110, for example, as shown in FIG. 4b, the second button 110. Hereby, a securing claw 112 is removed from the recess 114, in that it is swiveled around an axis 116, which is also vertical.

Figure 4C:
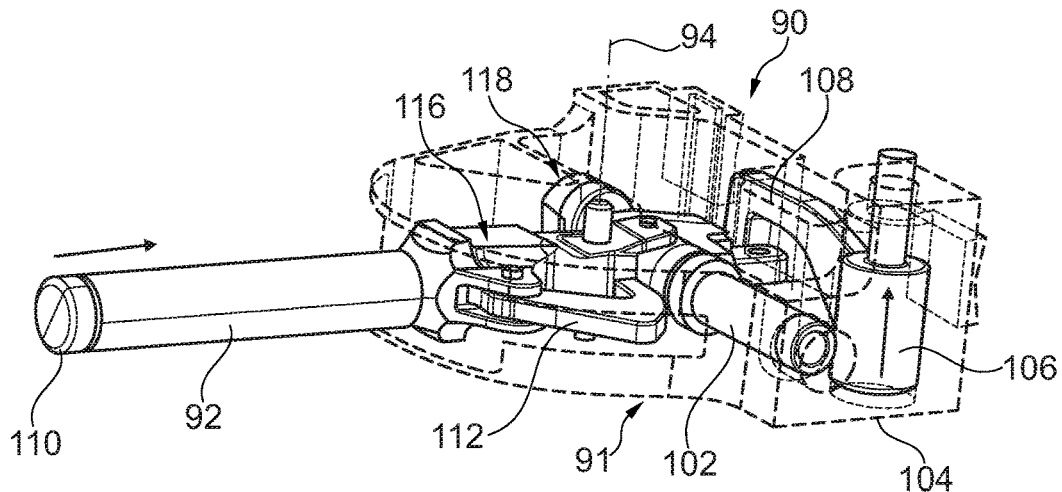
Figure 4D:
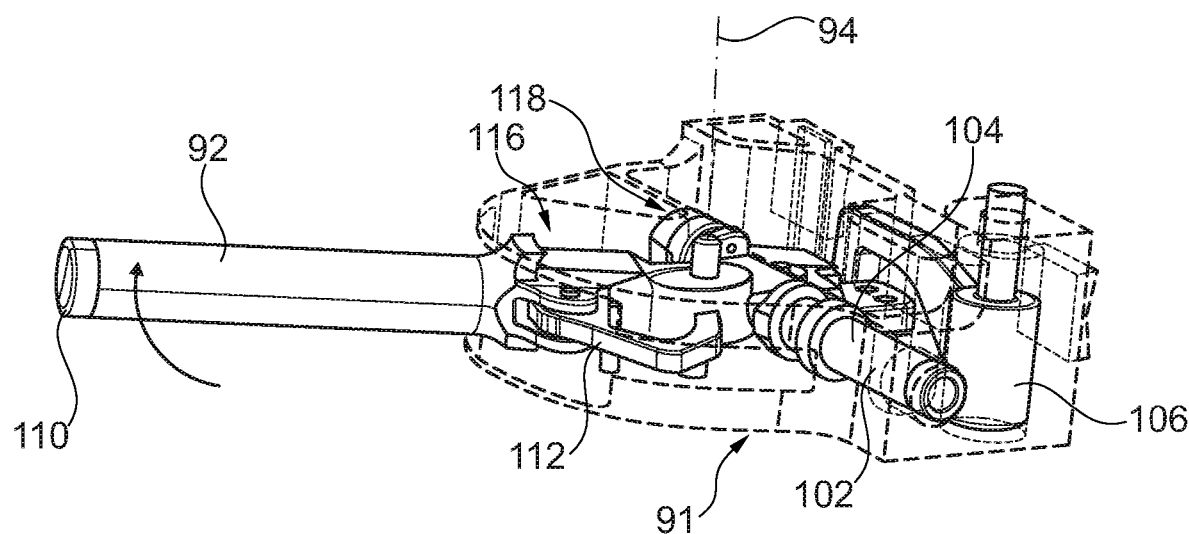

Subsequently, as shown in FIG. 4c, the button 106 is pressed, such that the securing claw 112 releases pin 102. Hence, both safeguards of the operating lever 92 are released, such that it is now swivable around axis 94, as shown in FIG. 4d.

Figure 4E:
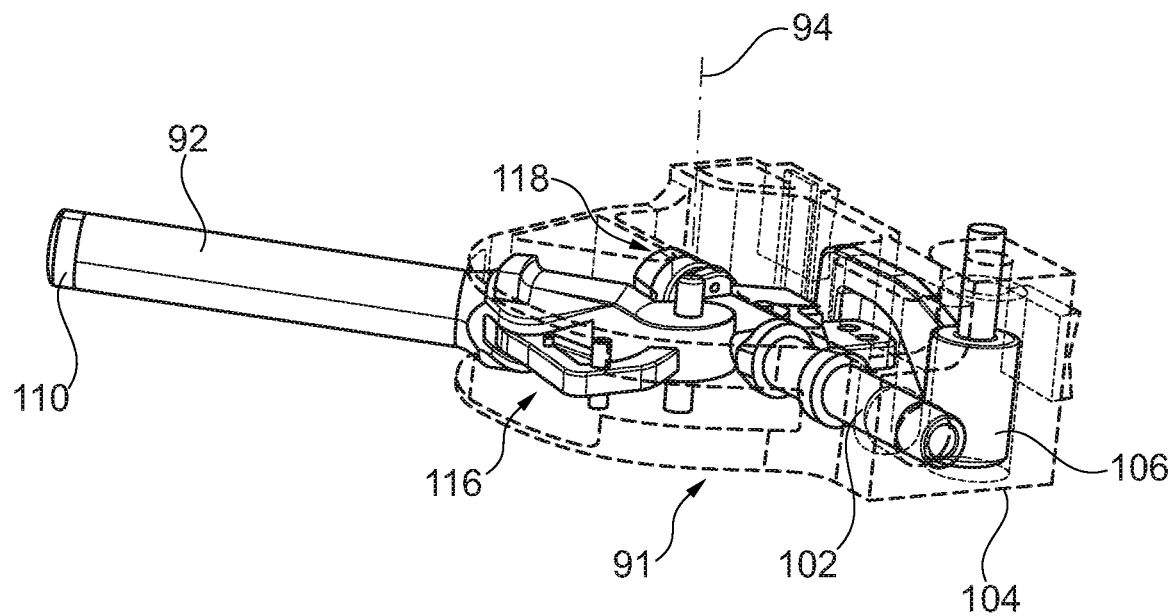

In FIG. 4e, an end position is reached, in which the safety pin 102 extends from the housing through the movement of the operating lever 92. In this position, the arresting device 36 from FIG. 2a may be released exemplarily through coupling a Bowden cable 62 at a rear end 118 of the safety pin 102.

Through the design of this apparatus, the Bowden cable 62 or the arresting device, respectively, may remain in the released position, such that the respective passenger seat is movable a plurality of times subsequently, until the operating lever 92 is swiveled back into a position shown in FIG. 4a. Through the extension of the safety pin 102 from the housing 96, a reliable optical indication is accomplished, that the passenger seat is present in the released position. This may be supported by providing a particularly well visible warning color on a ring-shaped peripheral surface of a part of the safety pin 102, which extends.

Figure 4F:
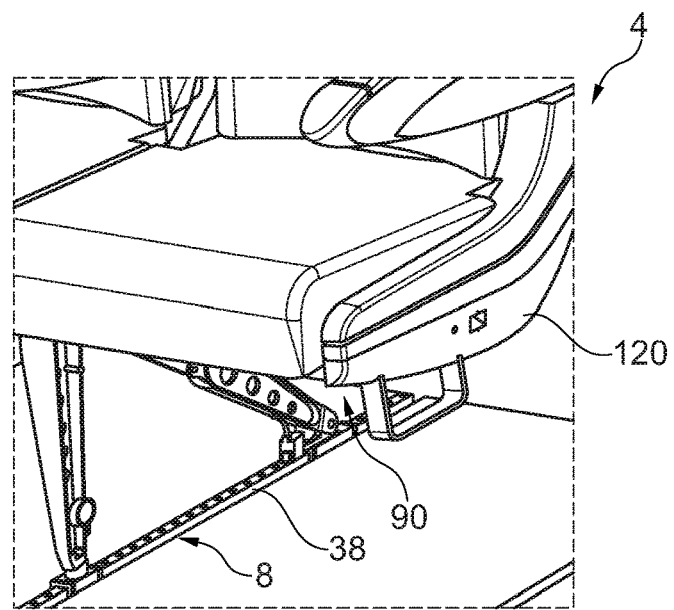

As shown in FIG. 4f, the operating unit may be arranged at the top side 24 of the seat frame 6 in such a manner, that the safety pin 102 may extend through an outer, lateral housing component 120 of the passenger seat 4 and, consequently, is immediately visible by viewing the passenger seat 4.

Figure 5:
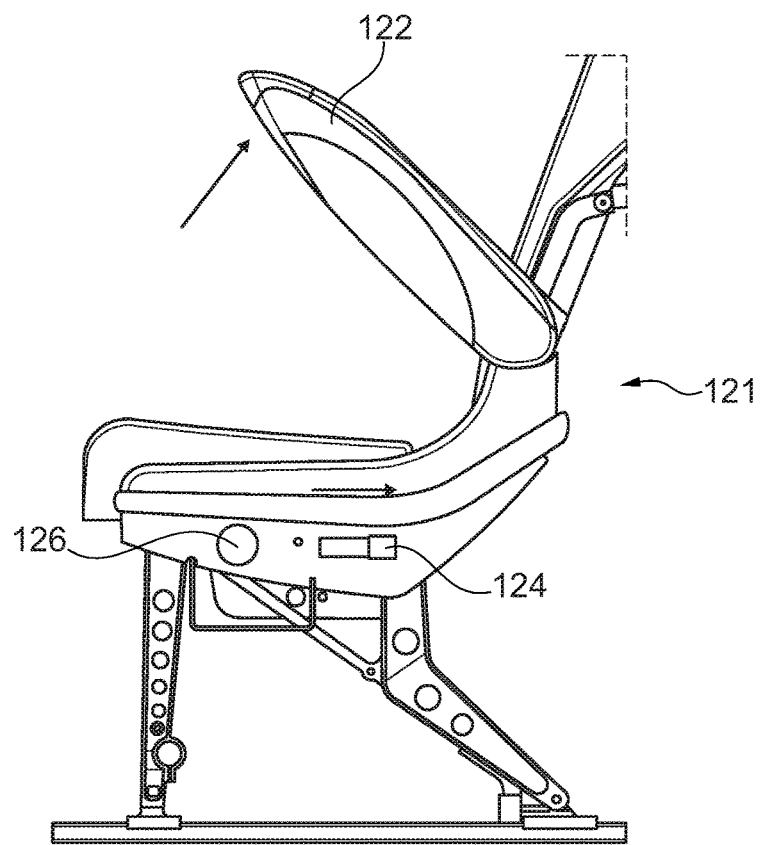
FIG. 5 illustrates an exemplary embodiment of an operating unit in a schematic view.

FIG. 5 shows a further modification of an operating unit having a blocking device, which is realized with already present objects of the passenger seat 4, which reach their blocking function through a variety of mechanical coupling elements, such as levers, Bowden cables or the such. Exemplarily, an outer armrest 122, which is swivably supported, is combined with an unlocking element 124 in such a manner, that a swiveling up of the armrest 122 a release of the unlocking element 124 is accomplished, which then releases the movement of a handle 126, which in turn is connected with the Bowden cable 62. The swiveling function of an armrest 122 is commonly present, even if it is sometimes only possible through a hidden release mechanism, which in turn contributes to a further safety against inadvertent operation of the arresting device.

FIGS. 6a and 6b show another operating unit in form of a lever 128, which is swivably supported on a connecting tube 132 between two tube clamps 130, which are adapted for clamping, i.e. attachment, to tubes of a seat frame (not shown). Through extending between the two tube clamps 130 the connecting tube 132 provides a swiveling axis 134, around which the lever 128 swivels.

By swiveling the lever 128, a connecting joint 136 moves circumferentially around the swiveling axis 134. A first link 138 is swivably coupled with the connecting joint 136 and swivably connected to second link 142 through a joint 140. The second link is swivably coupled to a joint 144 of a part of the seat frame 158. A third link 148 is swivably coupled to a further joint 146, which is opposite to joint 140. Hence, when the lever 128 is moved from a vertical position (see FIG. 6a) to a horizontal position (see FIG. 6b) the distance between the third link 148 and the swiveling axis 134 is increased.

The third link 148 is further coupled with a fourth link 152 through a joint 150, which in turn is swivably coupled to a slider 155 via a joint 154. The fourth link 152 is coupled with an arresting body in form of an arresting pin 156 integrated into an arresting device 157, wherein the arresting pin 156 is moved in a vertical position on rotation of the lever 128.

While the first link 138, the second link 142 and the third link 148 are straight, linear links, the fourth link 152 comprises an S-shape, which allows to provide a substantially vertical motion of the arresting pin 156.

A detail of how the lever 152 and the arresting pin 156 are integrated into a slider 155 is shown in FIG. 6c.

Figure 7A:
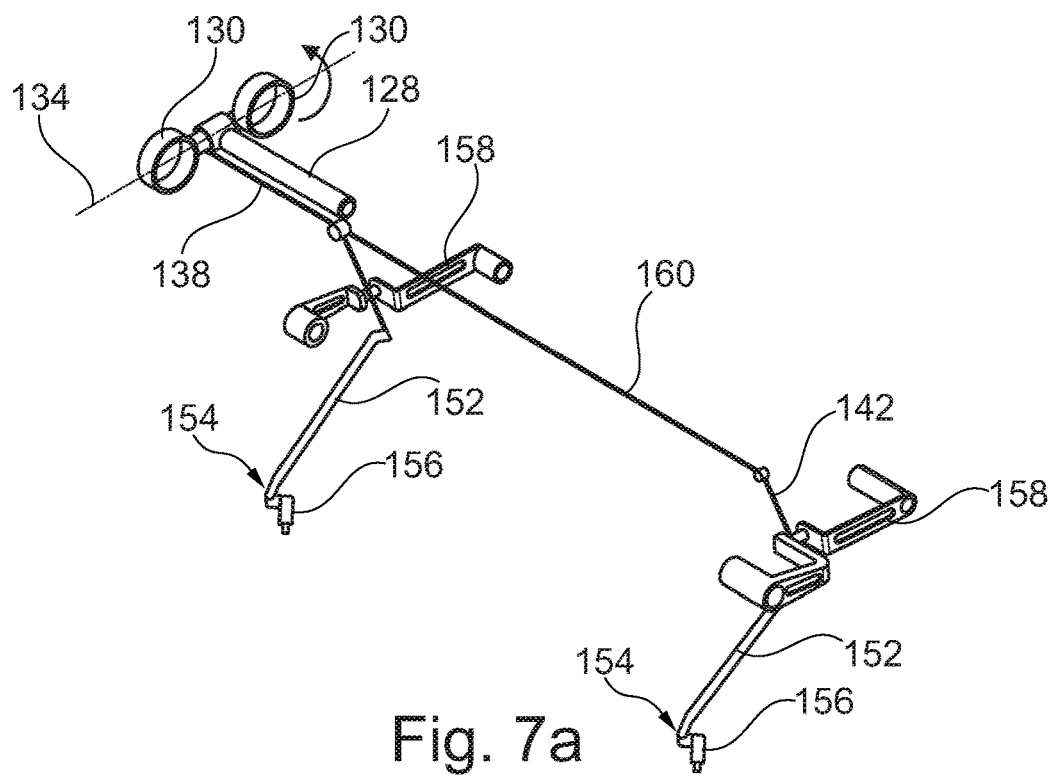
FIGS. 7a and 7b show a partial view of an operating element and two multi-link chains in spatial views.
Figure 7B:
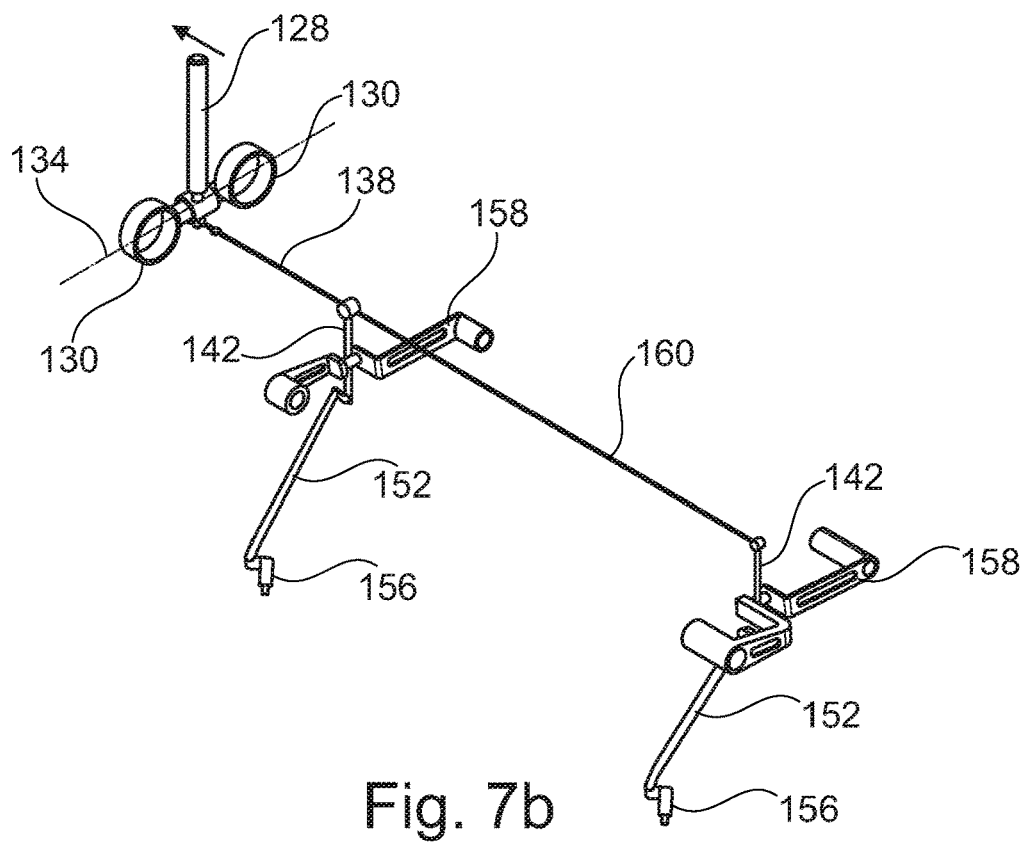

As shown in FIGS. 7a and 7b, each seat frame 158 may be equipped with two multi-link chains as shown in FIGS. 6a and 6b, which are kinematically coupled through a connection link 160. Hence, a single lever 128 is sufficient for arresting or releasing the arresting pin 156 from seat rails or the such.

Figure 8:
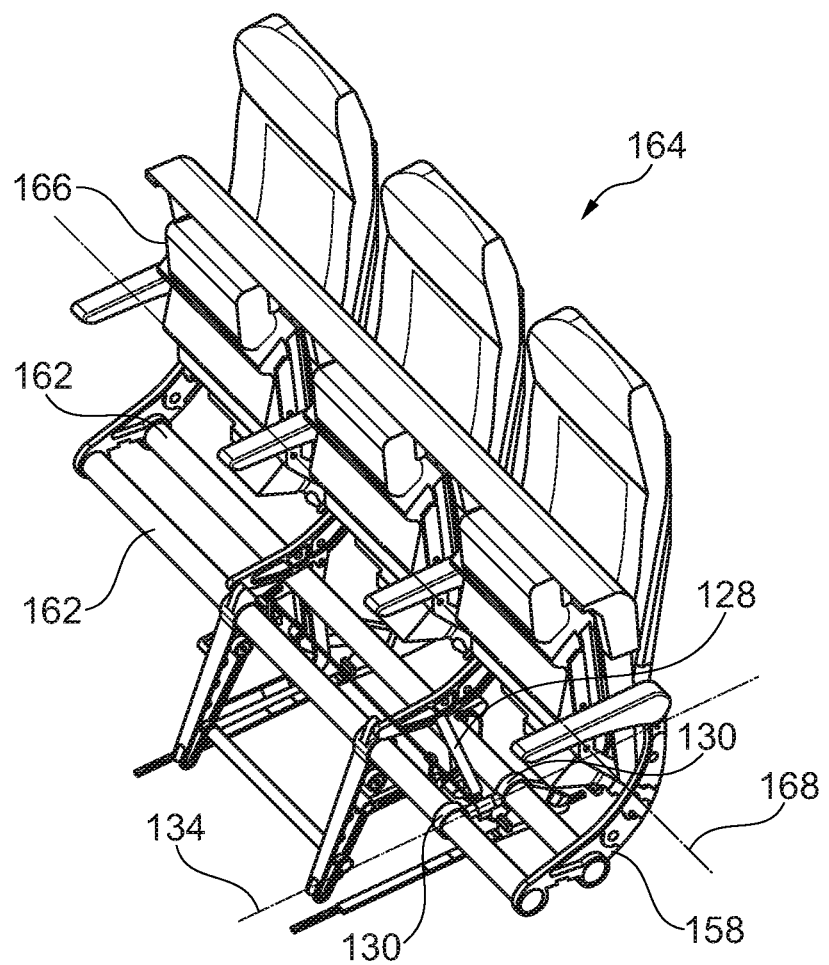
FIG. 8 shows a passenger seat group on a seat frame equipped with two multi-link chains and a single lever connected thereto, which is accessible with upwardly swept seating surfaces.

Finally, FIG. 8 shows a passenger seat group 164 on a seat frame 158, which is equipped with two hollow tubes 162 for receiving seat surfaces 166. The multi-link chains shown in FIGS. 6a to 7b are integrated into the seat frame 158 through clamping to the tubes 162 by means of the clamps 130. The lever 128 extends between the tubes 162 and is accessible only through lifting the seating surfaces 166. All elements of the multi-link chains are connected to the seat frame 158 without requiring any modification. Hence, the solution shown in FIG. 8 also suggests itself for a retrofit solution.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A passenger seat system for a transportation system, the passenger seat system comprising:
    at least one support structure;
    at least one seat, which comprises a seat frame, which is movable and arrestable on the support structure and has an underside that rests on the support structure and an upper side that receives a seating surface;
    a guiding body arranged on the support structure, the guiding body comprising a profile having at least one undercut;
    a slider movably supported on the guiding body arranged on at least one support structure; and
    wherein the at least one seat leg comprises a seat leg arranged on the slider,
    wherein the slider comprises a recess corresponding to the at least one undercut,
    wherein the seat frame comprises an arresting device on the underside and an operating unit on the upper side coupled with the arresting device, the arresting device forming an integral component of the slider;
    wherein the operating unit is movable into an arresting position and a release position and is blockable at least in the arresting position; and
    wherein the arresting device is adapted for arresting the seat frame on the support structure with the operating unit in the arresting position and to release it with the operating unit in the release position.

2. The passenger seat system according to claim 1, wherein the operating unit and a blocking device are arranged relative to each other, that they cannot be handled with a single hand at the same time.

3. The passenger seat system according to claim 1, wherein the support structure comprises an elongated seat rail having first locking means distributed along a longitudinal grid, and wherein the arresting device is adapted to be arrested at the first locking means.

4. The passenger seat system according to claim 3, wherein the guiding body extends parallel to the seat rail and is coupled therewith, wherein the guiding body is adapted for guiding a guiding section of the seat frame along the seat rail.

5. The passenger seat system according to claim 4, wherein the at least one guiding body comprises second locking means, which correspond with the first locking means of the seat rail.

6. The passenger seat system according to claim 1, wherein the arresting device comprises an arresting body, which is spring-loaded movably supported perpendicular to grid openings of the support structure, wherein the spring-loaded support is designed in a way that the arresting body is urged to the support structure or in one of the grid openings, respectively.

7. The passenger seat system according to claim 1, wherein the operating unit comprises a handle movably supported along a first displacement direction, which handle is securable at least in one position through a pin, which is movably supported along a second displacement direction, which is at an angle to the first displacement direction.

8. The passenger seat system according to claim 1, wherein the operating unit comprises an operating lever, which is movable between a neutral position and an arresting position, and wherein the blocking device comprises a first release button, which releases the blocking device through operating and releases the operating lever.

9. The passenger seat system according to claim 8, wherein the first release button is distanced from the operating lever in a way that a simultaneous operation of the first release button and the operating lever with one hand of the user is impossible.

10. The passenger seat system according to claim 8, wherein the blocking device further comprises a second release button, which releases the blocking device through a synchronous operation with the first release button.

11. The passenger seat system according to claim 1, wherein an armrest of the seat constitutes a part of the blocking device and releases the operating unit in an upwardly swept position.

12. The passenger seat system according to claim 1, wherein the operating unit is coupled with the arresting device through a multi-link chain comprising a plurality of interconnected links, the multi-link chain comprising a first end and a second end, wherein the first end is swivably coupled with the arresting device and wherein the second end is coupled with the operating unit.

13. The passenger seat system according to claim 12, wherein the seat frame comprises at least one tube at a top side for receiving a seating surface, wherein the operating unit is clamped to the at least one tube.

14. An aircraft cabin having a passenger seat system, the passenger seat system comprising:
- at least one support structure;
- at least one seat, which comprises a seat frame, which is movable and arrestable on the support structure and has an underside that rests on the support structure and an upper side that receives a seating surface; and
- a slider movably supported on the at least one support structure,
- wherein the at least one seat leg comprises a seat leg arranged on the slider,
- wherein the seat frame comprises an arresting device on the underside and an operating unit on the upper side coupled with the arresting device, the arresting device forming an integral component of the slider;
- wherein the operating unit is movable into an arresting position and a release position and is blockable at least in the arresting position;
- wherein the operating unit comprises:
  - first and second tube clamps configured for clamping tubes of the seat frame;
  - a connecting tube extending between the first and second tube clamps; and
  - a lever swivably supported on the connecting tube, and
- wherein the arresting device is adapted for arresting the seat frame on the support structure with the operating unit in the arresting position and to release it with the operating unit in the release position.

15. The aircraft cabin according to claim 14, further comprising service units above passenger seats, wherein the number of service units equals at least the maximum number of possible passenger seats underneath.

* * * * *